May 26, 1970        W. E. THORNTON        3,514,699

LIGHT BEAM OSCILLOSCOPE HAVING SUBSTANTIAL PERSISTENCE

Filed Nov. 6, 1967        3 Sheets-Sheet 1

INVENTOR:
William E. Thornton

ATTORNEY

Fig. 1A (Light Source -12-)

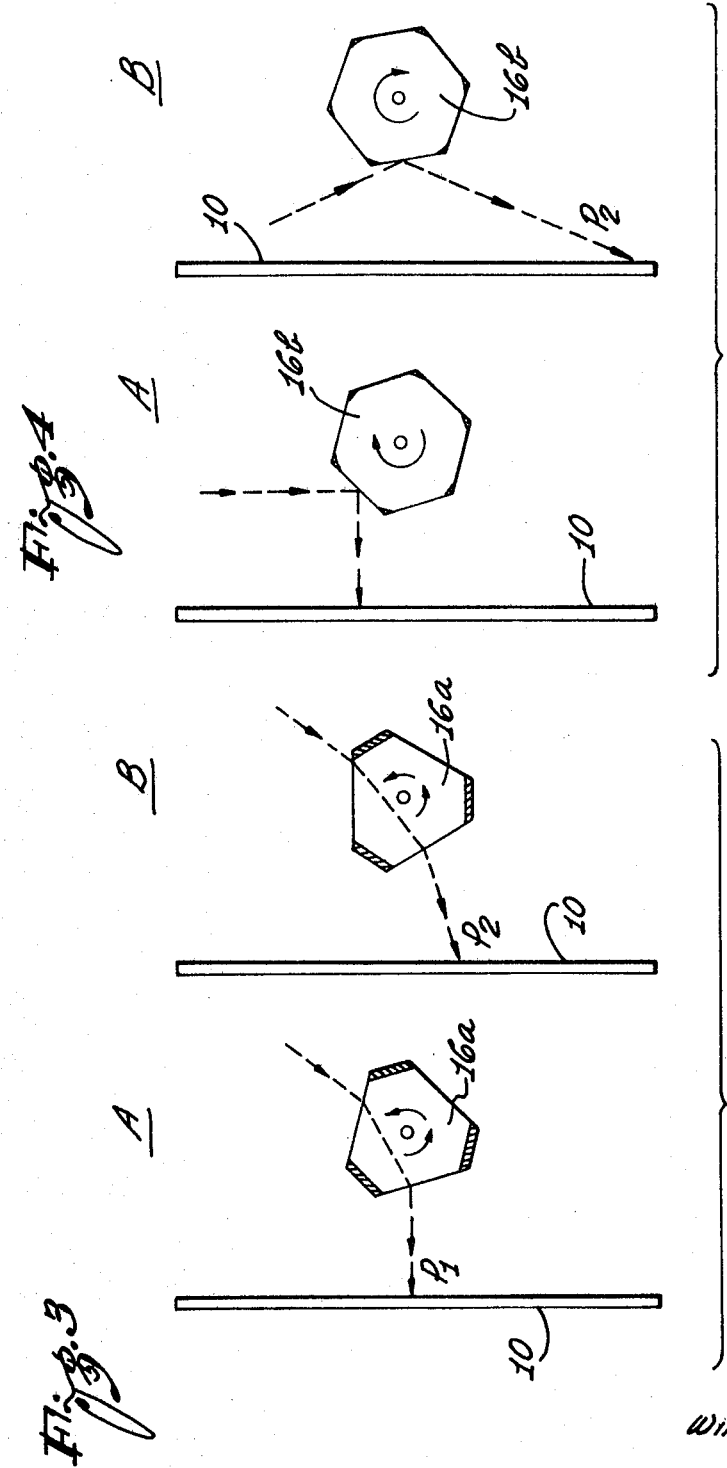

United States Patent Office 3,514,699
Patented May 26, 1970

3,514,699
LIGHT BEAM OSCILLOSCOPE HAVING SUBSTANTIAL PERSISTENCE
William E. Thornton, 205 Echo Ave.,
Friendswood, Tex. 77546
Filed Nov. 6, 1967, Ser. No. 680,765
Int. Cl. G01r *13/38*
U.S. Cl. 324—97                                7 Claims

ABSTRACT OF THE DISCLOSURE

A low-cost oscilloscope is described in the following specification, which finds particular utility, for example, in medical electronics for electrocardiograph applications, electro-encephalograph applications, and the like; and which is advantageous in that it does not require a cathode-ray tube, or any similar fragile instrument, and in that it does not require the relatively high voltages associated with the prior art cathode-ray tube oscilloscope.

BACKGROUND OF THE INVENTION

The cathode-ray tube oscilloscopes and oscillographs are presently in widespread use for the measurement and display of physiological and other low frequency phenomena. Although the cathode-ray tube oscillograph is functionally satisfactory, it is built around a cathode-ray tube which constitutes a relatively large, expensive and fragile item. Moreover, the cathode-ray tube incorporated in the prior art oscilloscope usually requires high accelerating voltages in the kilovolt range and high deflection voltages. The generation of the high voltages required to excite the usual cathode-ray tube in the prior art oscilloscope constitutes a real problem, especially at the lower frequencies.

Therefore, the present day cathode-ray tube oscilloscope is a relatively high cost instrument, and it generally requires a high operational voltages. The generation of such voltages, and the elaborate safety precautions required in conjunction therewith, not only adds to the expense of the prior art instrument, but also limits its use to none-explosive and non-oxygen atmospheres, unless extreme precautionary measures are taken. This precludes the use of the prior art cathode-ray tube oscilloscope in surgery, for example, where an extraordinary amount of explosive anesthetic mixtures are present, and where the monitoring function of the oscilloscope is often required, unless the most elaborate precautions are taken.

The oscilloscope of the present invention is most advantageous in that it does not require any type of vacuum tube, such as the prior art cathode-ray tube, and it does not require the high operational voltages associated therewith. The oscilloscope to be described is an optical type and it includes a viewing screen composed, for example, of fluorescent or phosphorescent material, and which is excited directly by a light beam under normal atmospheric conditions, rather than by an electron beam in a vacuum envelope, as was the prior art practice.

Optical oscilloscopes, of course, in general are known. These, however, for the most part involve the deflection of light beams across a viewing screen by mirrors, or the like. One of the mirrors is periodically deflected by a regularly occurring sweep signal derived from a suitable sweep system, and this provides for the recurrent deflection of the light beam across the screen in, for example, the X-axis direction. A second mirror is deflected by the signal to be displayed, and this latter mirror is included in a galvanometer type assembly. The second mirror, for example, deflects the light beam across the screen in the Y-axis direction.

The viewing screens in most of the prior art optical oscilloscopes have taken the form of light diffusing member, or a recording photographic film. However, in the case of the light diffusing member, the frequency of the signals to be displayed must be sufficiently high so as to fall within the normal persistence of vision interval. For low frequency applications, film recording only is possible in this type of instrument.

Attempts have been made in the past to excite a fluorescent screen in an optical type of oscilloscope, so that long persistence fluorescent materials may be used for low frequency signal displays, such as are encountered, for example, in medical electronics, such as electrocardiograph and electro-encephalograph applications, as mentioned above. However, these attempts have not been too successful, due to the difficulties encountered in providing for the adequate excitation of the fluorescent screen by a light beam, through relatively wide deflections of the beam and without the requirement of prohibitively costly equipment.

The oscilloscope of the present invention is predicated on the fact that fluorescent and phosphorescent screens of substantial persistence respond to light radiations, as well as to electron excitation, when the spectral characteristics of the light radiations match the spectral response of the screen material. For example, even in present-day cathode-ray tubes, where relatively long image persistence is required, two phosphors are generally used. A first phosphor is excited by the electron beam and has a relatively short persistence characteristic. Then, a second phosphor is excited by the resulting light from the first phosphor, and the second phosphor has a relatively long persistence characteristic. Specifically, the short persistence phosphor is excited by the electron beam at low emission energies in the prior art cathode-ray oscilloscopes, and it emits blue light as a result thereof. The blue light output from the first phosphor then causes a lower quantum energy yellow light transmission by the second long persistence phosphor. It has been found that when a screen of the latter type, composed, for example, of cadmium sulphide, is used, that the light from a usual incandescent lamp has sufficient energy in the spectral response range of the screen to excite the screen.

The viewing screen of the oscilloscope of the present invention may be formed of a single long persistence phosphor, and it is activated directly, as mentioned above, by a light beam. The light beam is collimated and focused by any known means, and it is directed to a scanning mirror, or other scanning device. The scanning mirror is controlled to scan the beam repeatedly across the screen, so as to provide a line scan for the oscilloscope.

A mirror galvanometer, or its equivalent, is included in the assembly. This galvanometer responds to the incoming signals to provide a Y-axis deflection for the light beam, assuming that the scanning direction is along the X-axis. The mirror galvanometer, per se, is a well known and readily available instrument, and it requires a minimum of power and deflection voltage to perform its intended function in the apparatus of the present invention.

SUMMARY OF THE INVENTION

The invention provides an improved oscilloscope in which a fluorescent or phosphorescent screen is activated directly by a light beam, the light beam being scanned and deflected across the screen in transverse directions in response respectively to scanning signals and to the signals to be measured.

BRIEF DESCRIPTION OF THE DRAWINGS

FIG. 1A is a schematic representation of various elements which may make up a light source included in the oscilloscope of FIG. 1;

FIGS. 3A and 3B show an appropriate prism-like scanning means for the light beam in the instrument of the invention; and FIG. 4 shows a second appropriate scanning means therefor.

DETAILED DESCRIPTION OF THE ILLUSTRATED EMBODIMENT

Figure 1:
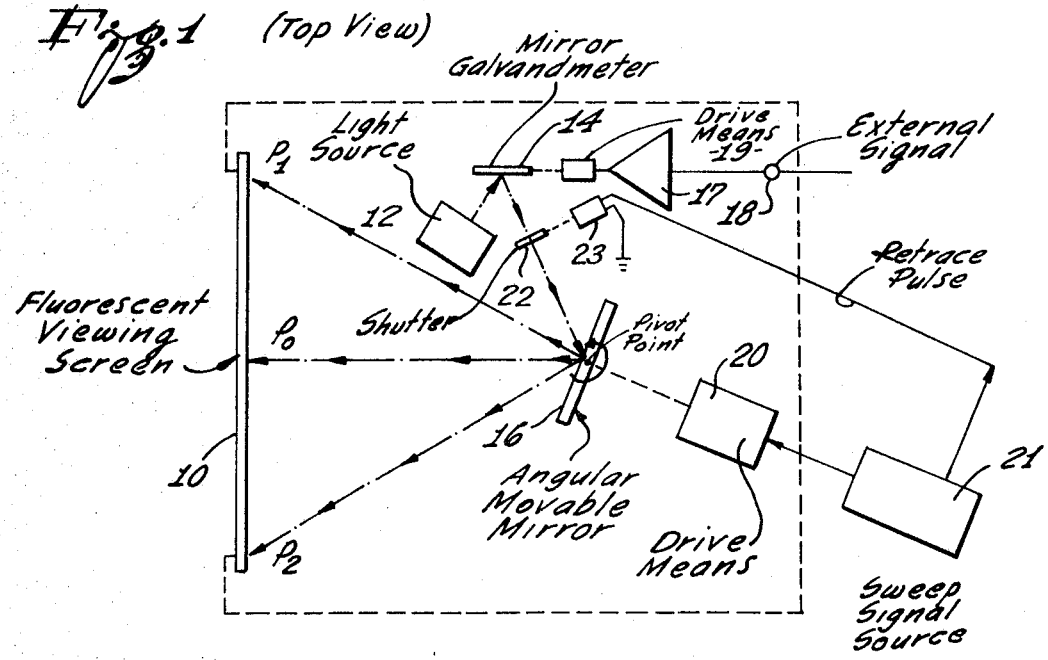
FIG. 1 is a schematic representation of an oscilloscope representing a first embodiment of the invention.
Figure 2:
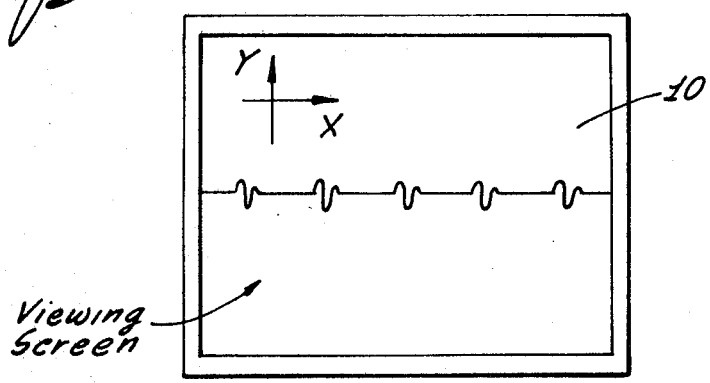
FIG. 2 is a front view of the viewing screen of the instrument of FIG. 1, and showing a typical trace across the screen.

The system shown in FIGS. 1 and 2, for example, includes a viewing screen 10. The viewing screen may be constructed by any known technique, and it is composed of a suitable fluorescent or phosphorescent material, having substantial persistence. As mentioned, cadmium sulphide is a suitable material. The screen 10 may be mounted by any appropriate mounting means, and, if desired, may be protected by encapsulation in a suitable clear plastic material. The screen 10 has the characteristic of responding to light radiation, and it may be formed, for example, of a selected long persistence yellow phosphor.

Figure 2A:
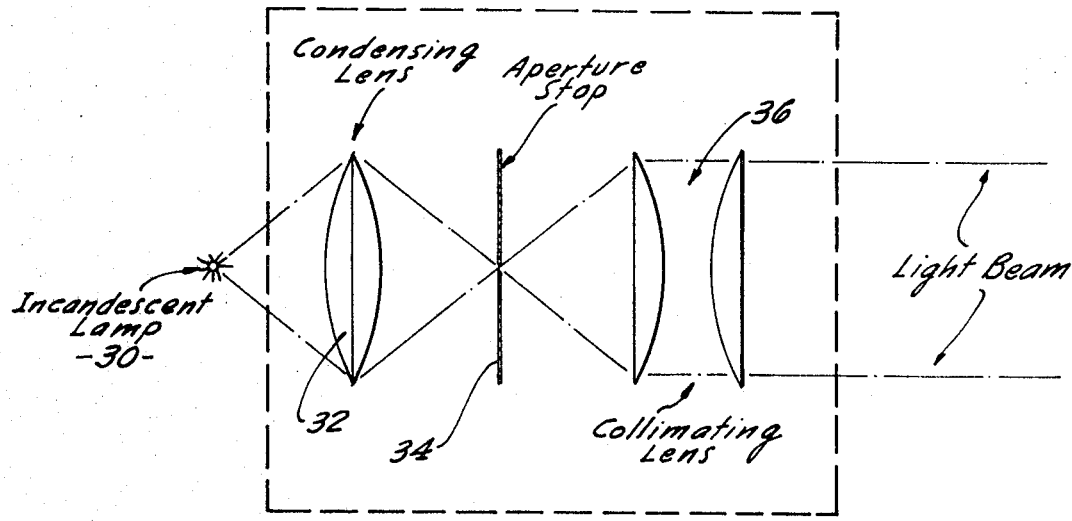
FIG. 2A is a representation of various response and other curves, useful in explaining the invention.
Figure 2A:
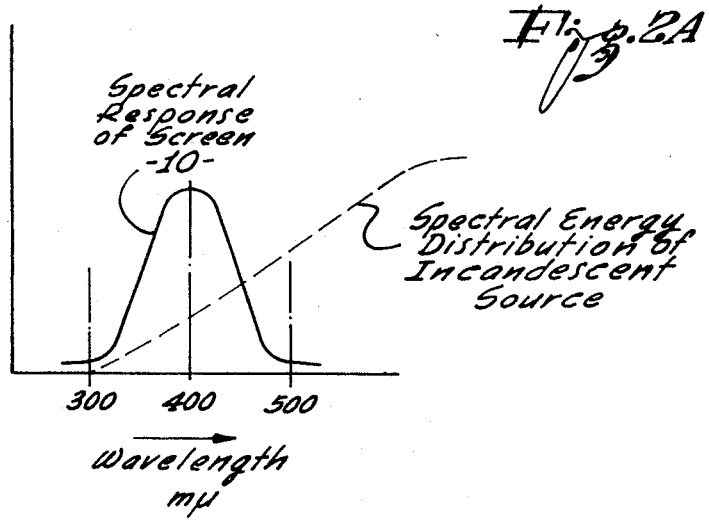

The system of FIG. 1 includes a light source 12. This light source may, for example, include a simple incandescent lamp, or any other suitable source of light. When an incandescent lamp is used, the wide range of resulting radiation is such that there is sufficient energy in the spectral response range of the fluorescent screen to excite the screen. However, a tungsten lamp may be used, or other source. The only requirement is that the radiation from the source must match the response of the screen. The only criterion is that the light from the source has sufficient energy in the spectral response range of the screen to excite the screen, as shown by the curves of FIG. 2A. The light produced by the light source 12 is collimated and focused into a beam by known optical elements, which may be included in the source.

These elements, as shown in FIG. 1A, may include an incandescent lamp 30, a condensing lens 32, a usual aperture stop 34 and a collimating lens system 36. The resulting light beam is directed to a galvanometer mirror 14 of any known inexpensive construction, and from there to an angularly movable scanning mirror 16. The light from the scanning mirror 16 is directed to the viewing screen 10. The parallel-ray light beam emanating from the source 16 may have a small cross-section and be sufficiently intense, so that relatively inexpensive plane mirrors and movements can be used in the oscilloscope of the invention.

As the scanning mirror 16 is deflected, the light beam is caused to move across the screen in the X-axis direction, from its position $P_1$ through it position $P_0$ to its position $P_2$. It will be appreciated that as the scanning mirror 16 is recurrently deflected at a uniform rate, the light beam is caused repeatedly to scan uniformly across the viewing screen 10 along the X-axis in a line from one side of the screen to the other, as shown in FIG. 2.

The mirror galvanometer may be of any known type, and such devices are well known to the market. The particular galvanometer selected for any particular apparatus incorporating the concepts of the present invention should have characteristics which depend on the maximum frequency response required for any particular application. Since mirror galvanometers normally operate on extremely low power levels, there is usually sufficient energy in the applied signal to perform the deflection function. However, an amplifier 17 may be included, so as to assure sufficient high signal level for deflecting the galvanometer, and to perform other signal conditioning functions. The incoming signal may be derived from an electro-cardiograph, or the like, and it is applied to an input terminal 18, which is connected to the amplifier. The amplifier controls a usual galvanometer drive means 19 which, in turn controls the deflection of the mirror 14.

The incoming signal causes the galvanometer mirror 14 to deflect the light beam from the source 12 in a direction perpendicular to the plane of the paper, and by an amount corresponding to the amplitude of the incoming signal. The resulting trace on the viewing screen 10 then takes the form shown, for example, in FIG. 2, in which the Y-deflection of the trace, for example, represents the amplitude of the incoming signal.

As mentioned above, mirror galvanometers such as the galvanometer 14 are standard equipment and are readily available, and suitable amplifiers 17 are small, simple and compact. Therefore, the oscilloscope of the present invention is relatively inexpensive, and operates at extremely low voltage levels. The scanning function of the member 16 may be achieved by deflecting the scanning member recurrently by any appropriate drive means 20. The drive means may be activated by an appropriate sweep signal source 21. The scanning member is deflected by the drive means 20 about an axis perpendicular to the plane of the paper and at a selected speed ($\omega_2$) which provides the X-deflection, or the "time base," for the display.

The scanning member 16 may take on a variety of forms. For example, it may be a prism, such as the prism 16a of FIGS. 3A and 3B, the prism being driven at a constant angular velocity $\omega_2$ by, for example, a constant speed motor in the drive means 20. Alternately, the scanning member 16 may take the form of a mult-faceted mirror 16b shown in FIGS. 4A and 4B, likewise driven at a constant speed $\omega_2$ by the drive means 20.

It will be appreciated that when the scanning is carried out in the manner described above, retrace is eliminated, and sweeps at a constant or variable rate may be achieved. That is, the sweep of the instrument may be varied in speed or synchronized, and this feature provides a measure of versatility for the equipment. When the flyback type of scanning is used, such as shown in FIG. 1, some means for blanking the light beam during the flyback is necessary, so as to prevent the production of visible retrace lines. This could be achieved, for example, by means of a simple solenoid shutter 22, such as shown in FIG. 1. The shutter is controlled by a solenoid 23, which in turn is energized by retrace pulses derived from the source 21. The solenoid causes the shutter to block the light beam during retrace.

The apparatus of the invention is advantageous in that it may be constructed to provide a relatively large viewing screen, and yet be relatively small, since it does not require a cathode-ray tube, and may, for example, be only a few inches wide. Also, the apparatus of the invention is advantageous in that it consumes extremely low power and low current, and could be battery operated for use in remote or hazardous atmospheres.

The apparatus may be constructed to provide multiple beams, since such would require merely additional light sources and mirror galvanometers.

As in the usual oscilloscope, an integral camera may be provided in the instrument of the invention, to provide simple photographic records. This could be achieved without lenses, through a simple beam splitter means which would focus a portion of the light beam on a photographic plate, so as to provide a simple and inexpensive photographic record.

Therefore, it will be appreciated that although a particular embodiment of the invention has been shown and described, modifications may be made. It is intended in the claims to cover all modifications which fall within the scope of the invention.

What is claimed is:

1. An oscilloscope including: a viewing screen exposed to the atmosphere and composed of a fluorescent material which luminesces when excited by a light beam, and which has a predetermined spectral response characteristic and substantial persistence; means for developing a light beam having a spectral energy distribution matching the spectral response characteristic of said screen and for directing the light beam conditions to the screen; scanning means in the path of said light beam for repeatedly scanning said light beam across said screen in a first direction; deflecting means in the path of said light beam for deflecting said light beam across said screen in a second direction transverse with respect to said first direction; and means for introducing an input signal to said deflecting means to control the deflection of said light beam across said screen in said transverse direction.

2. The combination defined in claim 1, in which said viewing screen is composed of cadmium sulphide, and terial.

3. The combination defined in claim 1, in which said scanning means includes a rotatably driven light refracting member.

4. The combination defined in claim 1, in which said scanning means includes a rotatably driven multi-facet reflecting member.

5. The combination defined in claim 1, in which said deflecting means includes a mirror galvanometer.

6. The combination defined in claim 1, in which said viewing screen is composed of cadmium sulphide, and in which said light beam developing means includes an incandescent lamp.

7. The combination defined in claim 1, in which said light beam developing means includes a lens system for producing a parallel-ray light beam.

References Cited

UNITED STATES PATENTS

| 2,103,053 | 2/1937 | Addink | 313—109 |
| 2,130,032 | 9/1938 | Robins. | |
| 2,692,370 | 10/1954 | Moore | 324—97 |
| 2,846,650 | 8/1958 | Rich | 324—97 |
| 2,898,176 | 8/1959 | McNaney | 346—110 |
| 3,026,476 | 3/1962 | Conner | 324—97 |

OTHER REFERENCES

Sihuonen, Boyd, Woelke: Some properties of green and red-green luminescing cds., Physical Review, vol. 113, No. 4, p. 965 (Feb. 15, 1959).

ALFRED E. SMITH, Primary Examiner